United States Patent
Pierson

(10) Patent No.: US 9,484,760 B2
(45) Date of Patent: Nov. 1, 2016

(54) EXTENDABLE JUMPER CABLES

(71) Applicant: Robert A. Pierson, New Lenox, IL (US)

(72) Inventor: Robert A. Pierson, New Lenox, IL (US)

( * ) Notice: Subject to any disclaimer, the term of this patent is extended or adjusted under 35 U.S.C. 154(b) by 160 days.

(21) Appl. No.: 14/536,345

(22) Filed: Nov. 7, 2014

(65) Prior Publication Data

US 2015/0130401 A1    May 14, 2015

Related U.S. Application Data

(60) Provisional application No. 61/901,632, filed on Nov. 8, 2013.

(51) Int. Cl.
*H02J 7/00* (2006.01)
*H02J 1/00* (2006.01)

(52) U.S. Cl.
CPC ............... *H02J 7/0054* (2013.01); *H02J 1/00* (2013.01); *H02J 2001/006* (2013.01)

(58) Field of Classification Search
CPC . H02J 7/0054; H01R 11/288; H01R 13/6392
USPC ........................................................ 320/105
See application file for complete search history.

(56) References Cited

U.S. PATENT DOCUMENTS

| | | | |
|---|---|---|---|
| 3,337,695 A * | 8/1967 | Brown ................... | H02G 11/02 191/12.4 |
| 4,272,142 A * | 6/1981 | Zapf .................. | H01R 13/6641 320/105 |
| 4,431,925 A * | 2/1984 | Frisbee .................. | H01H 3/503 200/16 C |
| 4,496,204 A * | 1/1985 | Conley .................. | H01R 11/24 174/69 |
| 4,721,479 A * | 1/1988 | Shuman ................. | H01R 13/71 439/503 |
| 4,904,205 A * | 2/1990 | Rice ....................... | H01R 13/72 191/12.4 |
| 5,348,125 A * | 9/1994 | Stribling ............... | B30B 9/3042 100/229 A |
| 6,130,519 A * | 10/2000 | Whiting ................ | H02J 7/0034 320/105 |
| 6,343,949 B1 * | 2/2002 | Floyd .................... | H01R 13/642 439/284 |
| 6,756,764 B2 * | 6/2004 | Smith ..................... | F02N 11/14 320/105 |
| 7,692,402 B2 * | 4/2010 | Wise ...................... | H02J 7/0054 320/105 |
| 9,193,274 B2 * | 11/2015 | Pursifull ............. | B60L 11/1816 |

\* cited by examiner

*Primary Examiner* — Sun Lin
(74) *Attorney, Agent, or Firm* — Donald Flaynik

(57) ABSTRACT

Extendable jumper cables for transferring electrical energy from a charged battery to a discharged battery include a first short cable having two clamp ends that detachably connect to two terminals of the charged battery, and a plug end that detachably connects to a cooperating plug end of a second short cable. The second short cable includes two clamp ends that detachably connect to two terminals of the discharged battery. The plug end and the cooperating plug end include cable connection fittings that allow the first short cable and the second short cable to be connected together to form a typical set of jumper cables. The plug end and the cooperating plug end further include respective plugs that cooperate to receive corresponding plugs of an extension cord to increase a length of the extendable jumper cables to electrically connect the charged battery and the discharged battery together when a distance separating the charged battery and the discharged battery is greater than a combined length of the first short cable and the second short cable.

20 Claims, 6 Drawing Sheets

EXTENDABLE JUMPER CABLES

This Utility Application is based on Provisional Application No. 61/901,632, filed on Nov. 8, 2013.

BACKGROUND OF THE INVENTION

1. Field of the Invention

The present invention relates generally to jumper cables for transferring electrical energy from a charged battery to a discharged battery, and more particularly, to extending the length of a typical pair of jumper cables to enable the transfer of electrical energy when the charged and discharged batteries are separated a distance greater than the length of the typical pair of jumper cables.

2. Background of the Prior Art

Battery jumper cables for transferring electrical energy from a charged battery to a discharged battery are commonly used by automobile and truck operators when the operator needs to "jump start" a vehicle with the discharged battery. The cables include two copper wires each typically between six to ten feet in length with equal diameters sufficient in dimension to allow predetermined electrical current magnitudes to "flow" through the wires from a charged battery to a discharged battery in a vehicle. The wires further include black and red "alligator" clamps such that one wire has only black (negative) clamps on each end and the other wire has only red (positive) clamps on each end to identify assist an operator when attaching the red clamp positive wire to the positive terminals of the charged and discharged batteries, and when attaching the black clamp negative wire to the negative terminals of the charged and discharged batteries.

The jumper cables are relatively easy to use when trying to jump start a vehicle, but a problem can arise when the vehicle with the charged battery is separated from the vehicle with the discharged battery a distance greater than the length of the jumper cables. This separation problem typically occurs in parking lots with a large number of vehicles parked side by side. To overcome this separation problem with the prior art, much longer, heavier and more expensive jumper cables would have to be procured by the vehicle operator.

A need exists for a jumper cable that includes some the physical characteristics of the typical jumper cable discussed above together with features that allow the jumper cables to be extended to a length that is greater than the distance separating the charged and discharged batteries.

SUMMARY OF THE INVENTION

A principle object of the present invention is to provide extendable battery jumper cables that enable the transfer of electrical energy when charged and discharged batteries are separated a distance greater than the length of typical jumper cables. A feature of the extendable jumper cables is two substantially equal length first and second short portions (see FIG. 1) each having clamp ends that ultimately attached to battery terminals, and each having plug ends that detachably join together to form longer jumper cables that electrically connect a charged battery to a discharged battery. An advantage of the joined first and second portions is that overall length of the joined first and second portions can be increased to ultimately connect charged and discharged batteries separated a distance greater than the length of the typical commercial jumper cables.

Another object of the present invention is to enable the extendable jumper cables to be extended over a range of predetermined distances. A feature of the variable range cables is a first short portion. Another feature of the variable range cables are multiple second portions of varying lengths to cover predetermined distances that correspond to the intended use of the jumper cables. An advantage of the varying the lengths of the second portions is that a car owner can buy a relatively inexpensive short second cable portion to connect his discharged battery to another close proximately battery. Another advantage is that a business owner in the business of using jumper cables to start cars with dead batteries can purchase a relatively longer and more expensive second cable portion to reach a dead battery in a car in a parking lot surrounded by other vehicles, resulting in a relatively long distance to connect the business owner's charged battery to a customer's dead battery.

Yet another object of the present invention is to add extension cable plugs (see FIG. 3) to the plug ends of the first and second short cable portions. A feature of the first and second cable portions with the added extension cable plugs is that the length of the jumper cables can be increased via a standard extension cable that includes wires having current capacities equal to the first and second short cable current ratings. An advantage of the added extension cable plugs is that the overall length of the first and second short cable portions can be relatively quickly and inexpensively increased to a length that ultimately connects the charged and discharged batteries together.

Still another object of the present invention is to provide plug connectors for each of the jumper cable alligator clamps that enable a typical extension cable to be electrically connected to the clamps to ultimately connect a charged battery to a discharged battery. A feature of each of the plug connectors is a pair of cable connectors joined to a first end of each of the plug connectors (see FIG. 4) for detachable joining of the plug connectors to respective alligator clamps that connect to respective charged and discharged batteries. Another feature of each of the plug connectors is a single plug joined to a second end of each of the plug connectors for detachable joining of the plug connectors to a cooperating end of an extension cable. An advantage of the plug connectors is that the connectors allow typical jumper cables to be replaced by a typical household extension cable having predetermined current capacities with standard male and female plugs. The extension cable would include a length sufficient to electrically connect the charged battery to the discharged battery in the respective vehicle.

Another object of the present invention is to provide extendable jumper cables that can be extended to a predetermined length without increasing the electrical resistance of the cables, thereby maintaining the magnitude of the charging current from the charged to the discharged battery, irrespective of the length of the jumper cables being doubled. A feature of the lengthened jumper cables is the connection of a single wire to each of the two ends of each alligator clamp (see FIG. 13). Anther feature of the lengthened jumper cables is the detachable joining of cooperating wires that ultimately connect together battery terminals of the same polarity for the charged and discharged batteries. An advantage of the lengthened jumper cables is that current flow from the charged to the discharged battery is maximized, thereby minimizing the time required to charge the discharged battery to a voltage sufficient to start the vehicle.

Briefly, the invention provides extendable jumper cables for transferring electrical energy from a charged battery to a discharged battery comprising:

a first electrically conductive clamp having clamping means for detachably connecting said first clamp to a positive terminal of a first battery, said first clamp having cable connecting means for detachably connecting said first clamp to a first electrically conductive cable;

a second electrically conductive clamp having clamping means for detachably connecting said second clamp to a negative terminal of the first battery, said second clamp having cable connecting means for detachably connecting said second clamp to a second electrically conductive cable;

a third electrically conductive clamp having clamping means for detachably connecting said third clamp to a positive terminal of a second battery, said third clamp having cable connecting means for detachably connecting said third clamp to said first electrically conductive cable;

a fourth electrically conductive clamp having clamping means for detachably connecting said fourth clamp to a negative terminal of the second battery, said fourth clamp having cable connecting means for detachably connecting said fourth clamp to said second electrically conductive cable;

a first short cable comprising:
a red wire having a first end electrically joined to said first clamp via a first cable fitting, said red wire having a second end electrically joined to a red insertion fitting and a black wire of an insertion plug; and
a black wire having a first end electrically joined to said second clamp via a third cable fitting, said black wire having a second end electrically joined to a black insertion fitting and a white wire of said insertion plug;

a second short cable comprising:
a red wire having a first end electrically joined to said third clamp via a second cable fitting, said red wire having a second end electrically joined to a red receiving fitting and a black wire of a receiving plug; and
a black wire having a first end electrically joined to said fourth clamp via a fourth cable fitting, said black wire having a second end electrically joined to a black receiving fitting and a white wire of said receiving plug;

means for electrically connecting said first short cable to said second short cable while said insertion and receiving plugs remain electrically disconnected to ultimately charge a discharged battery; and means for electrically connecting said insertion plug to said receiving plug such that the length of said extendable jumper cables can be increased to a predetermined distance, whereby said first and second short cables are electrically joined together while said first, second, third and fourth cable fittings remain electrically disconnected to ultimately charge a discharged battery.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
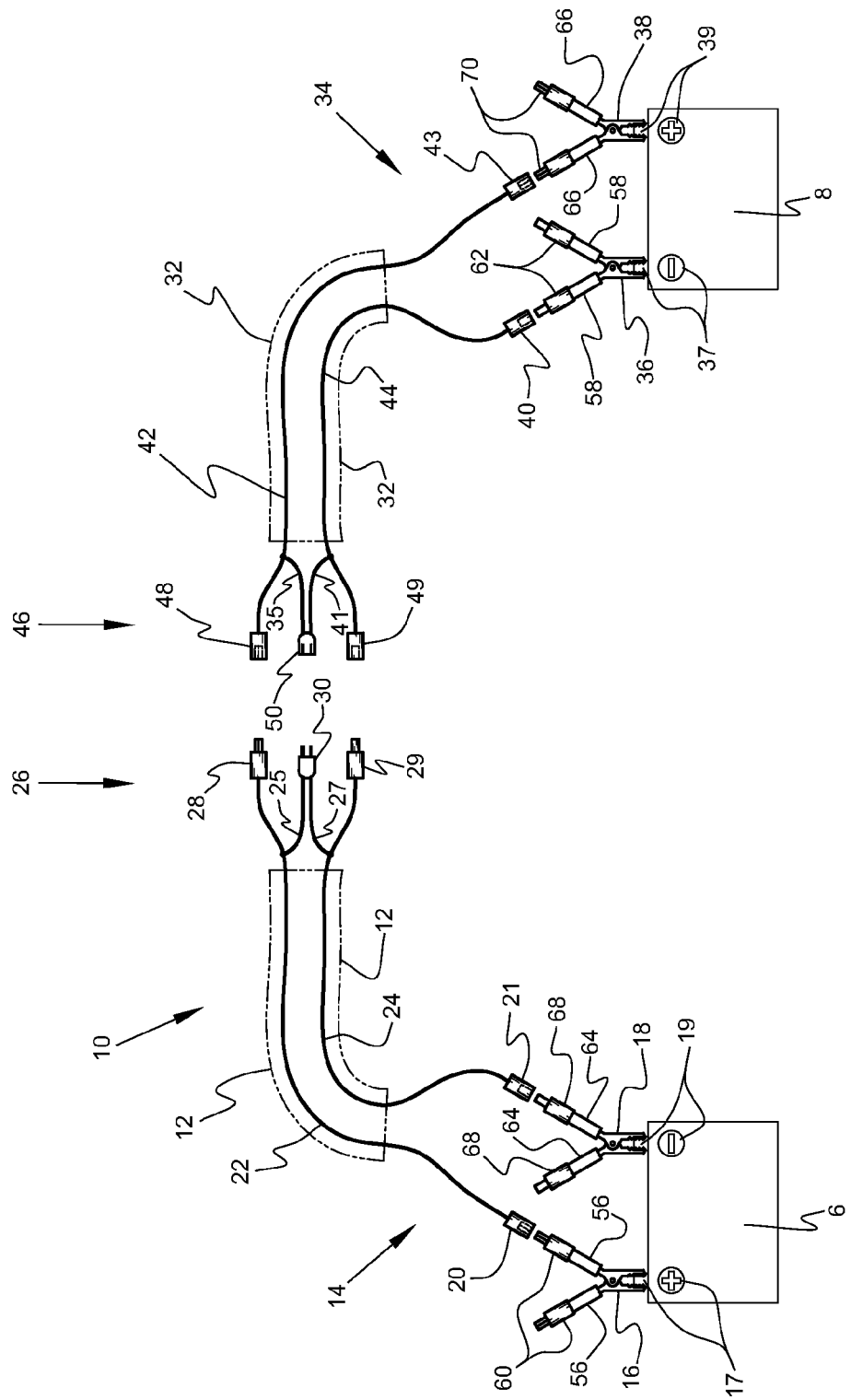
FIG. 1 is a wiring diagram for extendable jumper cables in accordance with the present invention.

Referring to FIGS. 1-4, extendable jumper cables for transferring electrical energy from a first battery 6 to a second battery 8 in accordance with the present invention are denoted as numeral 10. The extendable jumper cables 10 include substantially similar first, second, third and fourth electrically conductive clamps (16, 18, 36 and 38) having biased clamping means or "alligator clamps" (typical for jumper cables) that are manually maneuvered for detachably connecting the first clamp 16 to a positive terminal 17 of an electrically charged first battery 6, the second clamp 18 to a negative terminal 19 of the first battery 6, the third clamp 36 to a negative terminal 37 of an electrically discharged or second battery 8, and the fourth clamp 38 to a positive terminal 39 of the second battery 8.

The extendable jumper cables 10 include a first short cable 12 having a clamp end 14 with first and second electrically conductive clamps (16 and 18) detachably connected to first cable fittings 20 and 21 that are integrally secured to corresponding red and black wires (22 and 24) that form the first short cable 12. The first short cable 12 further includes a plug end 26 having red and black insertion cable fittings (28 and 29) that are integrally secured to respective red and black wires (22 and 24) that form the first short cable 12. The plug end 26 further includes an extension cable insertion plug 30 for inserting into a cooperating receiving plug 33 of an extension cord or long cable 31, the insertion plug 30 being connected to the plug end 26 such that the red wire 22 is electrically joined to the positive "leg" 25 of the insertion plug 30 and the black wire 24 is electrically joined to the negative leg 27 of the insertion plug 30, resulting in the red insertion cable fitting 28, the positive leg 25 of the insertion plug 30 and the red wire 22 all being electrically joined together, and resulting in the black insertion cable fitting 29, the negative leg 27 of the insertion plug 30 and the black wire 24 all being electrically joined together.

The extendable jumper cables 10 further include a second short cable 32 having a clamp end 34 with third and fourth electrically conductive clamps (36 and 38) detachably connected to second cable fittings 40 and 43 that are integrally secured to corresponding black and red wires (44 and 42) that form the second short cable 32. The second short cable 32 further includes a plug end 46 having red and black second cable fittings (48 and 49) that are integrally secured to respective red and black wires (42 and 44) that form the second short cable 32. The plug end 46 further includes a receiving plug 50 for receiving a cooperating insertion plug 51 of the extension cord or long cable 31, the receiving plug 50 being connected to the plug end 46 such that the red wire 42 is electrically joined to the positive "leg" 35 of the receiving plug 50 and the black wire 44 is electrically joined to the negative leg 41 of the receiving plug 50, resulting in the red second cable fitting 48, the positive leg 35 of the receiving plug 50 and the red wire 42 all being electrically joined together; and resulting in the black second cable fitting 49, the negative leg 41 of the receiving plug 50 and the black wire 44 all being electrically joined together.

The first and fourth clamps (16 and 38) are fabricated from copper or similar conducting material, and include a red rubber or plastic hand grip secured about the periphery of each of two hand grip portions 56 of the first clamp 16, and each of two hand grip portions 66 of the fourth clamp 38. Red handgrips are dimensioned to cover the periphery of first cable connectors 60 integrally joined to the handgrip portions 56 of the first clamp 14. Red handgrips are also dimensioned to cover the periphery of fourth cable connectors 70 integrally joined to the handgrip portions 66 of the fourth clamp 38.

The second and third clamps (18 and 36) are fabricated from copper or similar conducting metal, and include a black rubber or plastic hand grip secured about the periphery of each of two hand grip portions 64 of the second clamp 18, and each of two hand grip portions 58 of the third clamp 36. Black handgrips are dimensioned to cover the periphery of third cable connectors 68 integrally joined to the hand grip portions 64 of the second clamp 18, and fourth cable connectors 70 integrally joined to the hand grip portions 66 of the fourth clamp 38. The red wires (22 and 42) of the first and second short cables 12 and 32 connected to the first and fourth clamps (16 and 38), are fabricated from copper or similar conductive material and include a red insulation cover fabricated from rubber or similar non-conductive material. The black wires (24 and 44) of the first and second short cables 12 and 32 connected to the second and third clamps 18 and 36, are fabricated from copper or similar conductive material and include a black insulation cover fabricated from rubber or similar non-conductive material.

Figure 2:
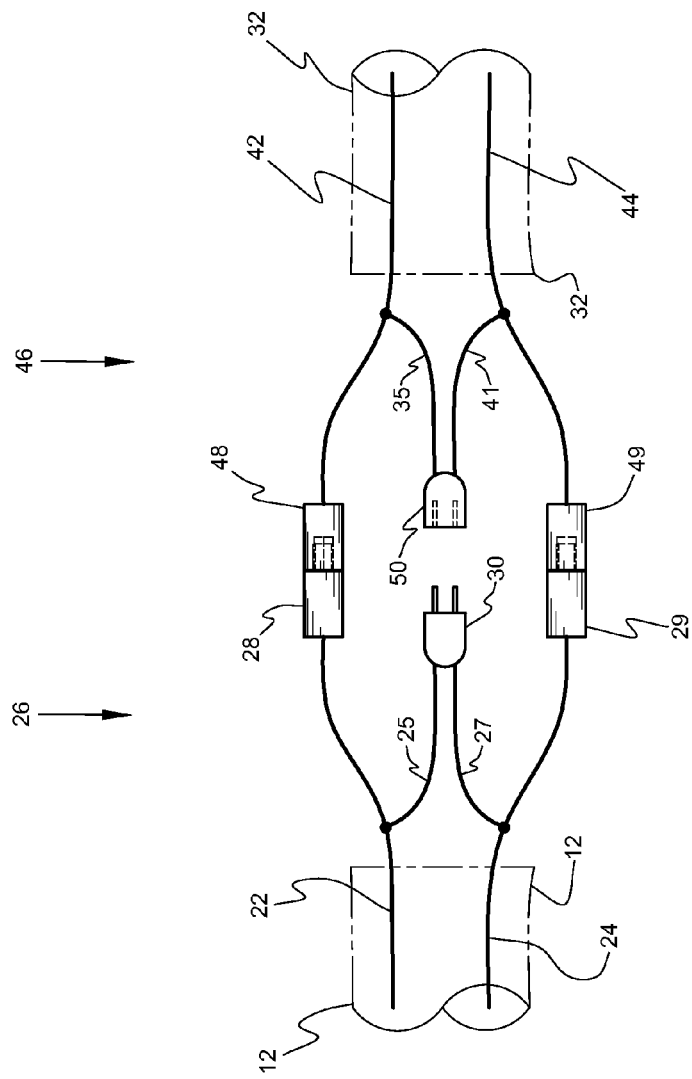
FIG. 2 is a connection diagram for cable fittings of plug ends of first and second short cables in accordance with the present invention.

Referring now to FIGS. 1 and 2, the first clamp 16 includes two cable connecting means or first cable connectors 60 that detachably insert into a cooperating first cable fitting 20 integrally secured to a corresponding first red wire 22. The second clamp 18 includes two first cable connectors 68 that detachably insert into a cooperating second cable fitting 21 integrally secured to a corresponding first black wire 24. The third clamp 36 includes two, second cable connectors 62 that detachably insert into a cooperating second cable fitting 40 integrally secured to a corresponding second black wire 44. The fourth clamp 38 includes two, second cable connectors 70 that detachably insert into a cooperating second cable fitting 43 integrally secured to a corresponding second red wire 42. The clamps, cable fittings, and first and second short cables 12 and 32 are cooperatively connected (with the plugs 30 and 50 disconnected from an extension cord 31 as depicted in FIG. 2) to transfer electrical energy from a charged battery 6 to a discharged battery when separated a distance of typically about twelve feet. When a distance separating the batteries 6 and 8 is greater than the length of the connected first and second cables 12 and 32, a sufficiently long extension cord 31 is used to connect the charged battery 6 to the discharged battery 8 with the cable fittings 28, 29, 48 and 49 being disconnected as depicted in FIG. 3.

Figure 3:
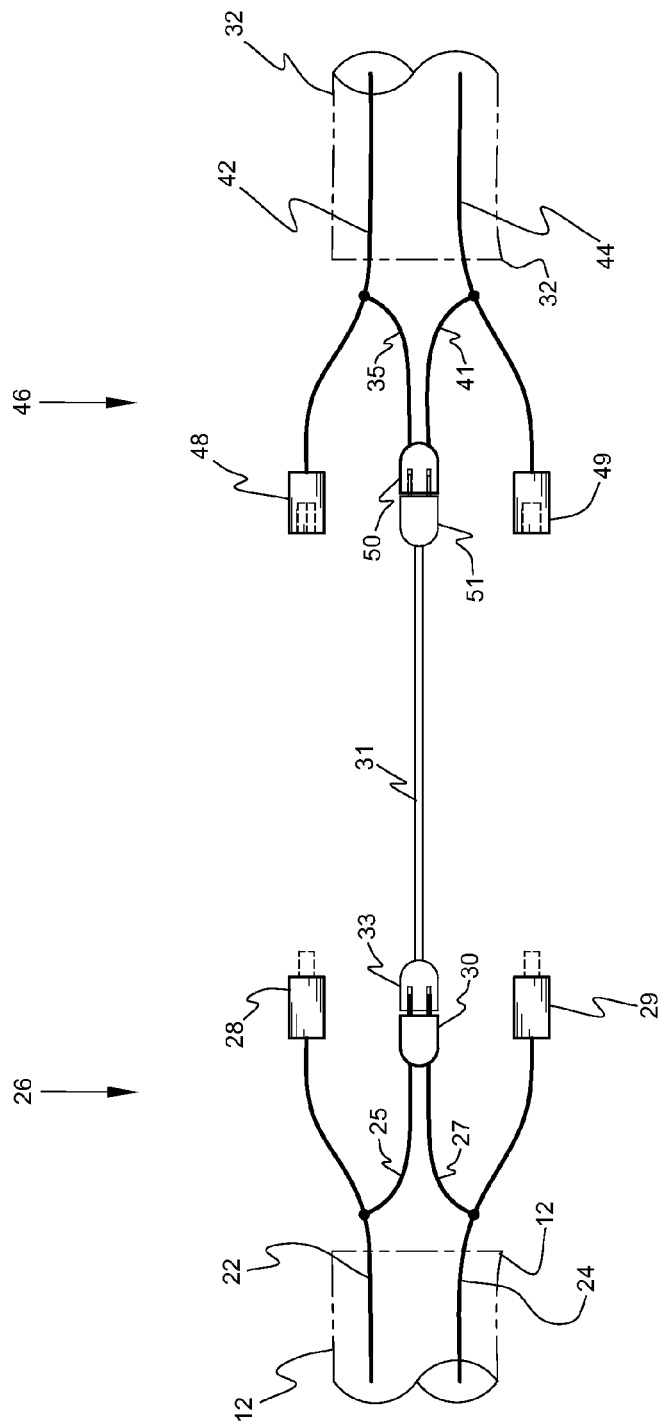
FIG. 3 is a connection diagram for insertion and receiving plugs of respective plug ends of first and second short cables in accordance with the present invention.

Referring to FIGS. 1-3, the plug end 26 of the first short cable 12 includes an insertion portion or plug 30 with extending insertion prongs substantially similar to a typical insertion portion or plug 51 of a standard extension cord 31. The plug 30 includes a black or "hot" wire 25 that is electrically connected to the red wire 22 of the first short cable 12, a white or "neutral" wire 27 is electrically connected to the black wire 24 of the first short cable. The electrical connections of the hot and neutral wires 25 and 27 to the respective red and black wires 22 and 24 of the first short cable 12 is achieved via means well known to those of ordinary skill in the art. The insertion portion 30, when inserted into the receiving portion 33 of the extension cord 31, electrically connects the electrically positive red wire 22 of the first cable 12 to a black or "hot" wire in the extension cord 31; and electrically connects the electrically negative black wire 24 of the first cable 12 to a white or "neutral" wire in the extension cord 31. The insertion plug 51 of the extension cord 31, when inserted into the cooperating receiving plug 50 of the second short cable 32, electrically connects the black wire in the extension cord 31 to the electrically positive red wire 42 of the second short cable 32; and electrically connects the white wire in the extension cord 31 to the electrically negative black wire 44 of the second short cable 32, resulting in the connection of the positive terminal 17 of the charged battery 6 to the positive terminal 39 of the discharged battery 8, and the connection of the negative terminal 19 of the charged battery 6 to the negative terminal 37 of the discharged battery 8.

Figure 4:
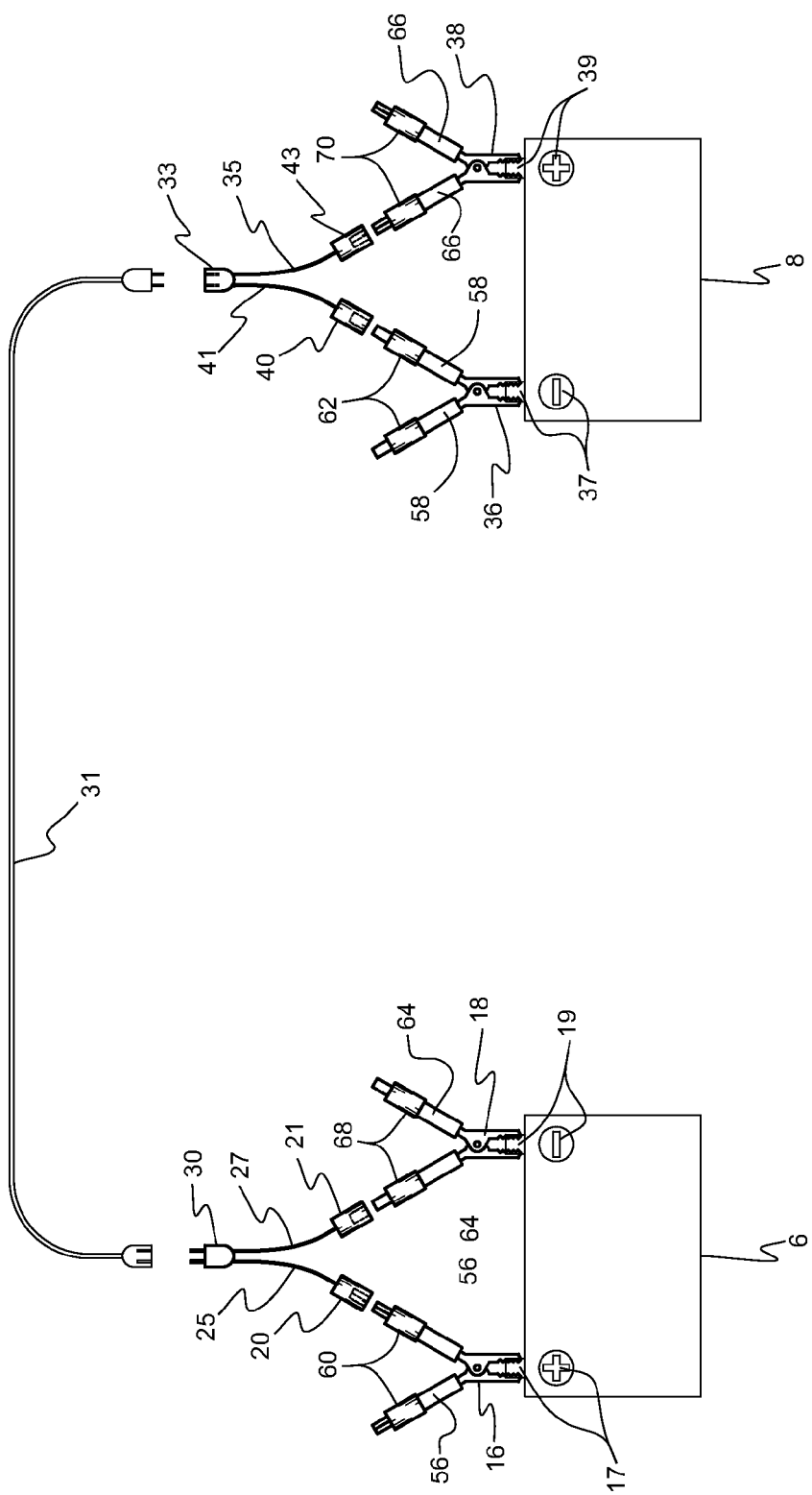
FIG. 4 is a wiring diagram for an alternative embodiment for extendable jumper cables in accordance with the present invention.

Referring now to FIG. 4, an alternative concept and/or design for the extendable jumper cables of FIGS. 1-3 is illustrated in FIG. 4. The alternative design includes the replacement of the first and second short cables 12 and 32 with an extension cord 31. The alternative design further includes the integral connection of the hot leg or first wire 25 of insertion plug 30 with the first cable fitting 20, the integral connection of the neutral leg or second wire 27 of the insertion plug 30 with the second cable fitting 21, the integral connection of the hot leg or fourth wire 35 of the receiving plug 33 with the fourth cable fitting 43, and the integral connection of the neutral leg or third wire 41 of the receiving plug 33 with the third cable fitting 40. The alternative design reduces the cost of the extendable jumper cables 10 by eliminating red wires 22 and 42, and black wires 24 and 44, and providing a typical extension cord 31 and cooperating plugs 30 and 33 with relatively short inexpensive hot (25 and 35) and neutral (27 and 41) wires that electrically connect to corresponding cable fittings (20, 21, 40 and 43).

Figure 5:
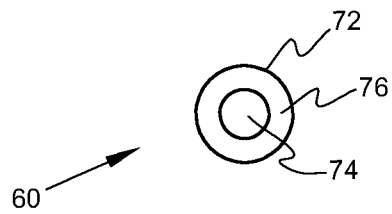
FIG. 5 is an insertion end view of the first cable connectors for the first clamp.
Figure 6:
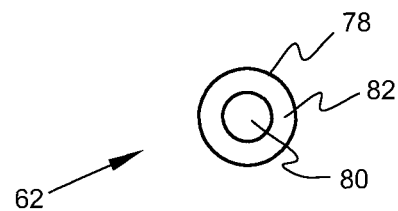
FIG. 6 is an insertion end view of the second cable connectors for the fourth clamp.
Figure 7:
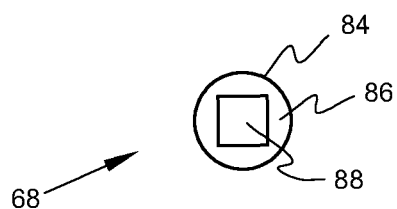
FIG. 7 is an insertion end view of the first cable connectors for the second clamp.
Figure 8:
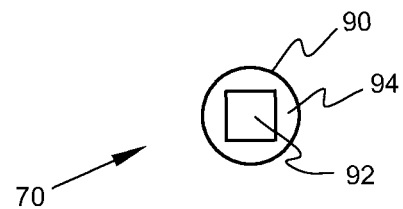
FIG. 8 is an insertion end view of the second cable connectors for the third clamp.

The first cable connectors 60 (FIG. 5) integrally joined to the hand grip portions 56 of the first clamp 16, include cylindrical outer walls 72 with cylindrical central recesses 74 extending from outer ends 76 of each of the first cable connectors 60. A red insulation material is circumferentially disposed about the first cable connectors 60 such that the insertion of the first cable connector 60 into the first cable fitting 20 is unobstructed. The second cable connectors 70 (FIG. 6) integrally joined to the hand grip portions 66 of the fourth clamp 38, include cylindrical outer walls 78 with cylindrical central recesses 80 extending from outer ends 82 of each of the second cable connectors 70. A red insulation material is circumferentially disposed about the second cable connectors 70 such that the insertion of the second cable connectors 70 into the cable fitting 43, also circumferentially wrapped with a red insulation material, is unobstructed. The first cable connectors 68 (FIG. 7) integrally joined to the hand grip portions 64 of the second clamp 18, include cylindrical outer walls 84 with square configured central protrusions 86 extending from outer ends 88 of each of the first cable connectors 68. A black insulation material is circumferentially disposed about the first cable connectors 68 such that the insertion of the connectors 68 into the second cable fitting 21 is unobstructed. The second cable connectors 62 (FIG. 8) integrally joined to the handgrip portions 58 of the third clamp 36, include cylindrical outer walls 90 with square configured central protrusions 92 extending from outer ends 94 of each of the second cable connectors 62. A black insulation material is circumferentially disposed about the second cable connectors 62 such that the insertion of the second cable connector 62 into the fitting 40 is unobstructed.

Figure 9:
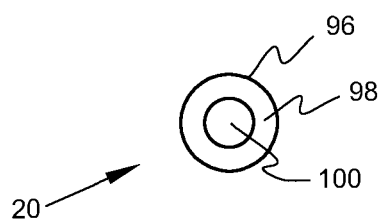
FIG. 9 is a receiving end view of the first cable fitting that connects to the red wire in the first short cable.
Figure 10:
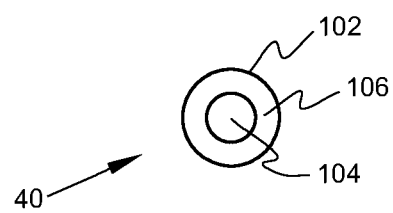
FIG. 10 is a receiving end view of the second cable fitting that connects to the red wire in the second short cable.
Figure 11:
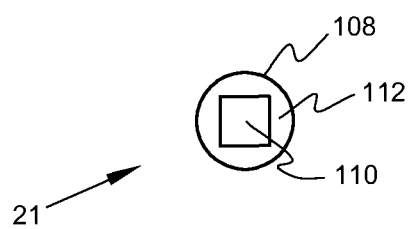
FIG. 11 is a receiving end view of the first cable fitting that connects to the black wire in the first short cable.
Figure 12:
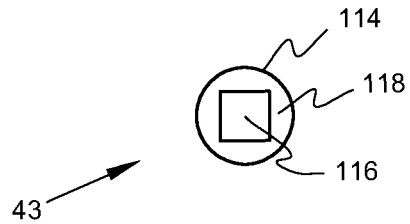
FIG. 12 is a receiving end view of the second cable fitting that connects to the black wire in the second short cable.

The first cable fitting 20 integrally secured to the corresponding red wire 22 of the first short cable 12 (FIG. 9), includes cylindrical outer walls 96 with a cylindrically configured central recess 98 in an outer end 100 of the first cable fitting 20. The second cable fitting 43 integrally secured to the red wire 42 of the second short cable 32 (FIG. 10), includes cylindrical outer walls 102 with a cylindrical central recess 104 in outer end 106 of the second cable fitting 43. The first cable fitting 21 integrally secured to the black wire 24 of the first short cable 12 (FIG. 11), includes cylindrical outer walls 108 with a square configured central recess 110 in an outer end 112 of the cable fitting 21. The second cable fitting 40 integrally secured to the black wire 44 of the second short cable 32 (FIG. 12), includes cylindrical outer walls 114 with a square configured central recess 116 in outer end 118 of the second cable fitting 40.

The cylindrical protrusions 74 of the first cable connectors 60 are slightly smaller in diameter and length than the corresponding diameter and depth of the cylindrical recess 98 of the first cable fitting 20, thereby promoting the snug insertion of the first cable connector 60 into the first cable fitting 20. The first cable connectors 60 and the first cable fitting 20 include cooperating retaining means (not depicted) well known to those of ordinary skill in the art, which include but not limited to, a typical ratchet and socket tool that has a spring biased ball protruding from a side wall of a protrusion from the ratchet; the biased ball ultimately forcibly engaging an inner wall of the socket after the protrusion from the ratchet is forcibly inserted into the socket.

The cylindrical protrusions 80 of the of the second cable connectors 70 are slightly smaller in diameter and length than the corresponding diameter and depth of the cylindrical recess 104 of the second cable fitting 43, thereby promoting the snug insertion of the second cable connector 70 into the second cable fitting 43. The same cooperating retaining means are employed for snugly retaining the cylindrical protrusions 80 of the second cable connectors 70 in the cylindrical recess 104 of the second cable fitting 43 after manually joining one of the second cable connectors 70 with the second cable fitting 43.

The square configured protrusions 86 of the first cable connectors 68 have a slightly smaller periphery and axial length than the corresponding periphery and axial depth of the square configured recess 110 of the first cable fitting 21, thereby promoting the snug insertion of the first cable connector 68 into the recess 110 of the cable fitting 21. The same cooperating retaining means are employed for snugly retaining the square configured protrusions 86 of the first cable connectors 68 in the square configured recess 110 of the first cable fitting 21, after manually joining one of the first cable connectors 68 with the first cable fitting 21.

The square configured protrusions 92 of the second cable connectors 62 have a slightly smaller periphery and axial length than the corresponding periphery and axial depth of the square configured recess 116 of the second cable fitting 40, thereby promoting the snug insertion of one of the second cable connectors 62 into the recess 116 of the second cable fitting 40. The same cooperating retaining means are employed for snugly retaining the square configured protrusions 92 of the second cable connectors 62 in the second cable fitting 40 after manually joining one of the second cable connectors 62 with the second cable fitting 40.

In the preferred embodiment of the present invention, the configurations and dimensions of the first cable connectors 60 and 68, and the second cable connectors 62 and 70 are substantially identical. Further, the cylindrical and square configurations and dimensions of the first cable fittings 20 and 21, and the corresponding cylindrical and square configurations and dimensions of the second cable fittings 40 and 43 are substantially identical. The cooperating cylindrical and square configurations of corresponding protrusions and recesses insure that the polarities of the batteries will be maintained so long as only red clamps and red cables are joined together, and black clamps and black cables are joined together.

In operation, extendable jumper cables 10 include first and second short cables 12 and 32 having typical lengths of substantially about six feet each, thereby forming a twelve foot, cable when the first and second cables 12 and 32 are detachably joined to transfer electrical energy from a charged battery 6 to a discharged battery 8. The length of the cables 12 and 32 plus the maximum current carrying capacity of the cables dictates the amount of electrical current flow from the charged battery 6 to the discharged battery 8. So long as the distance separating the batteries 6 and 8 is proximately twelve feet or less, the batteries can be electrically connected via the joined short cables 12 and 32. Should longer cables be required, and should the required magnitude of the electrical charging current flowing through the cables be less than the required current flowing through the joined short cables 12 and 32, then more than two red wires and two black wires can be joined together in series (so long as the total length of the series red wires equals the length of the series black wires) to increase the length of the extendable jumper cables 10 to a predetermined distance corresponding to the distance separating the charged and discharged batteries 6 and 8. Alternatively, when a distance separating the batteries 6 and 8 is greater than the length of the connected first and second cables 12 and 32, an extension cord 31 having the required length is connected to the plugs 30 and 50 of the first and second cables 12 and 32 (with the cable fittings 28, 29, 48 and 49 disconnected) to transfer electrical energy from the charged battery 6 to the discharged battery 8.

Should longer cables be required, and should the magnitude of the electrical charging current flowing through the cables be required to be maintained relative to the joined first and second short cables 12 and 32, the longer cables would have to be larger in diameter, thereby reducing the electrical resistance of the longer cables and correspondingly maintaining the magnitude of current. Longer, heavier, more expensive cables may be impractical to use in situations where one car battery is being used to charge a discharged car battery. The extendable jumper cables 10 of the current invention are cable of being increased in length without increasing the cables diameter or decreasing current flow.

Figure 13:
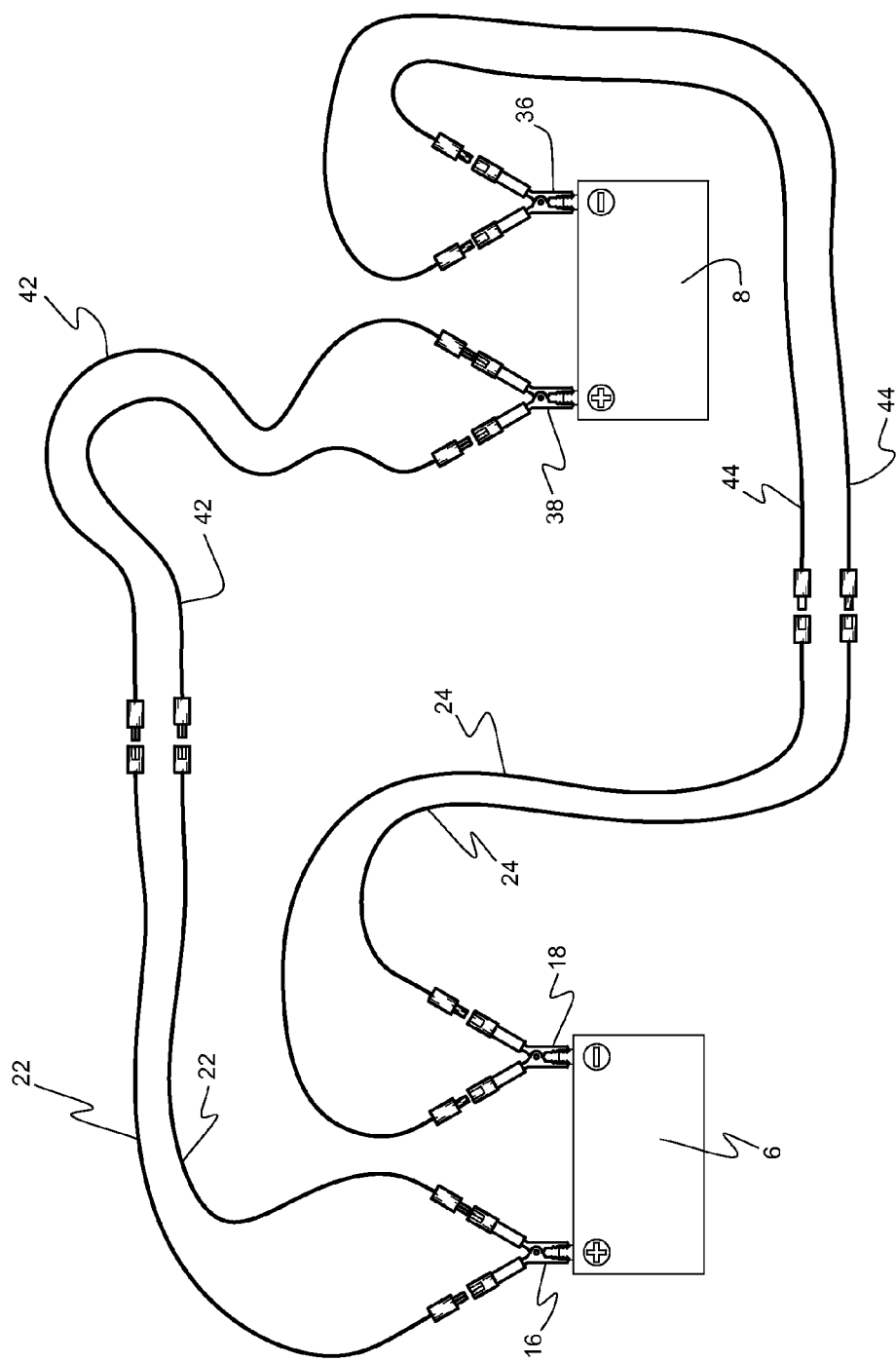
FIG. 13 is a wiring diagram for extendable jumper cables with the extendable jumper cables depicted with two sets of two red wires joined in series, and two sets of two black wires joined in series to double the length of the jumper cables to maintain the same resistance as when using one-half the number of wires with each wire being one-half the length as the wires depicted in the cable arrangement in FIG. 1 in accordance with the present invention.

Referring now to FIG. 13, the extendable jumper cables 10 of FIG. 1 are depicted with two sets of two red wires (22 and 42) are joined in series with the same cable fitting arrangement and numbers as depicted in FIG. 1. Each of the two sets of two red wire series arrangement is repeated with each red wire being substantially 12 feet in length, resulting in two sets of series connected red wires with each series of two red wires being 24 feet in length. The same lengths and configurations are included for the two sets of series connected black wires (24 and 44). More specifically, there are two, twenty-four foot lengths of red wires in electrical parallel, and two 24 foot lengths of black wires in electrical parallel.

The cable arrangement of FIG. 13 allowed the distance separating the batteries 6 and 8 to be doubled while maintaining the electrical resistance of the four red cables equal to the resistance of one red cable, and the electrical resistance of the four black cables equal to the resistance of one black cable. The four cable arrangement for each of the red and black sets of cables maintains the electrical current flow between the two batteries 6 and 8 equal to the current flow between the batteries 6 and 8 when one red cable 22 and one black cable 24 are used to connect corresponding battery terminals. The cable arrangement for maintaining cable resistance while increasing length is based upon the electrical resistance formula pertaining to two resistance components in parallel:

Total Resistance for $R1$ and $R2$ in parallel=$(R1 \times R2)$ divided by $(R1+R2)$ A formula well known to those of ordinary skill in the art.

The invention claimed is:
1. Extendable jumper cables for transferring electrical energy from a charged battery to a discharged battery, the extendable jumper cables comprising:
a first clamp being electrically conductive and having clamping means for detachably connecting said first clamp to a positive terminal of a first battery, said first clamp having cable connecting means for detachably connecting said first clamp to a first electrically conductive cable;
a second clamp being electrically conductive and having clamping means for detachably connecting said second clamp to a negative terminal of the first battery, said second clamp having cable connecting means for detachably connecting said second clamp to a second electrically conductive cable;
a third clamp being electrically conductive and having clamping means for detachably connecting said third clamp to a positive terminal of a second battery, said third clamp having cable connecting means for detachably connecting said third clamp to said first electrically conductive cable;
a fourth clamp being electrically conductive and having clamping means for detachably connecting said fourth clamp to a negative terminal of the second battery, said fourth clamp having cable connecting means for detachably connecting said fourth clamp to said second electrically conductive cable;
a first short cable comprising:
a red wire having a first end electrically joined to said first clamp via a first cable fitting, said red wire having a second end electrically joined to a red insertion fitting and a black wire of an insertion plug; and
a black wire having a first end electrically joined to said second clamp via a third cable fitting, said black wire having a second end electrically joined to a black insertion fitting and a white wire of said insertion plug;
a second short cable comprising:
a red wire having a first end electrically joined to said third clamp via a second cable fitting, said red wire having a second end electrically joined to a red receiving fitting and a black wire of a receiving plug; and
a black wire having a first end electrically joined to said fourth clamp via a fourth cable fitting, said black wire having a second end electrically joined to a black receiving fitting and a white wire of said receiving plug;
means for electrically connecting said first short cable to said second short cable while said insertion plug and said receiving plug remain electrically disconnected to ultimately charge a discharged battery; and
means for electrically connecting said insertion plug to said receiving plug such that a length of said extendable jumper cables can be increased to a predetermined distance, whereby said first cable and said second short cable are electrically joined together while said first cable fitting, said second cable fitting, said third cable fitting and said fourth cable fitting remain electrically disconnected to ultimately charge a discharged battery.
2. Extendable jumper cables comprising:
a first clamp being electrically conductive and having clamping means for detachably connecting said first clamp to a positive terminal of a first battery, said first clamp having cable connecting means for detachably connecting said first clamp to a first electrically conductive cable;
a second clamp being electrically conductive and having clamping means for detachably connecting said second clamp to a negative terminal of the first battery, said second clamp having cable connecting means for detachably connecting said second clamp to a second electrically conductive cable;
a third clamp being electrically conductive and having clamping means for detachably connecting said third clamp to a positive terminal of a second battery, said third clamp having cable connecting means for detachably connecting said third clamp to said first electrically conductive cable;
a fourth clamp being electrically conductive and having clamping means for detachably connecting said fourth clamp to a negative terminal of the second battery, said fourth clamp having cable connecting means for detachably connecting said fourth clamp to said second electrically conductive cable;
means for electrically joining said first clamp to a first end of a first extension wire, and means for electrically joining a second end of said first extension wire to said third clamp;
means for electrically joining said second clamp to a first end of a second extension wire, and means for electrically joining a second end of said second extension wire to said fourth clamp, said first extension wire and said second extension wire having substantially equal lengths;

means for maintaining the positive polarity of said first clamp and positive polarity of said third clamp; and means for maintaining the negative polarity of said second clamp and negative polarity of said fourth clamp.

3. The extendable jumper cables of claim 2 wherein said means for electrically joining said first clamp to said third clamp includes securing electrically conductive cable fittings to opposite ends of said first electrically conductive cable.

4. The extendable jumper cables of claim 3 wherein said first electrically conductive cable includes multiple sections detachably joined by cooperating cable fittings.

5. The extendable jumper cables of claim 2 wherein said means for electrically joining said second clamp to said fourth clamp includes securing electrically conductive cable fittings to opposite ends of said second electrically conductive cable.

6. The extendable jumper cables of claim 5 wherein said second electrically conductive cable includes multiple sections detachably joined by cooperating cable fittings.

7. The extendable jumper cables of claim 2 wherein said means for maintaining the positive polarity of said first clamp and the positive polarity of said third clamp includes configuring said cable connecting means of said first clamp and said cable connecting means of said third clamp to include a first configuration.

8. The extendable jumper cables of claim 2 wherein said means for maintaining the positive polarity of said first clamp and the positive polarity of said third clamp includes configuring said cable connecting means of said first clamp and said cable connecting means of said third clamp, and configuring electrically conductive cable connectors for said first and second ends of said first extension wire to include said first configuration.

9. The extendable jumper cables of claim 2 wherein said means for maintaining the negative polarity of said second clamp and the negative polarity of said fourth clamp includes configuring said cable connecting means of said second clamp and said cable connecting means of said fourth clamp to include a second configuration.

10. The extendable jumper cables of claim 2 wherein said means for maintaining the negative polarity of said second clamp and the negative polarity of said fourth clamp includes configuring said cable connecting means of said second clamp and said cable connecting means of said fourth clamp, and configuring electrically conductive cable connectors for said first and second ends of said second extension wire to include said second configuration.

11. The extendable jumper cables of claim 2 wherein said cable connecting means for said first, second, third and fourth clamps includes two cable connectors for each of said first, second, third and fourth clamps.

12. The extendable jumper cables of claim 2 wherein said first electrically conductive cable includes two substantially equal length and diameter conductive wires each having a first end detachably joined to said first clamp, said conductive wires of said first electrically conductive cable each having a second end detachably joined to said third clamp, thereby placing said two conductive wires of said first electrically conductive cable in an electrically parallel arrangement.

13. The extendable jumper cables of claim 2 wherein said second electrically conductive cable includes two substantially equal length and diameter electrically conductive wires each having a first end detachably joined to said second clamp, said two electrically conductive wires of said second electrically conductive cable each having a second end detachably joined to said fourth clamp, thereby placing said two electrically conductive wires of said second electrically conductive cable in an electrically parallel arrangement.

14. The extendable jumper cables of claim 12 wherein said two substantially equal length and diameter conductive wires in an electrically parallel arrangement allows a length of said first electrically conductive cable to be doubled without reducing an electrical current flow between the first battery and the second battery.

15. The extendable jumper cables of claim 13 wherein said two substantially equal length and diameter conductive wires in an electrically parallel arrangement allows a length of said second electrically conductive cable to be doubled without reducing the electrical current flow between the first battery and the second battery.

16. Extendable jumper cables for transferring electrical energy from a charged battery to a discharged battery comprising:

a first clamp being electrically conductive and having clamping means for detachably connecting said first clamp to a positive terminal of a first battery, said first clamp having cable connecting means for detachably connecting said first clamp to a first electrically conductive wire;

a second clamp being electrically conductive and having clamping means for detachably connecting said second clamp to a negative terminal of the first battery, said second clamp having cable connecting means for detachably connecting said second clamp to a second electrically conductive wire;

a third clamp being electrically conductive and having clamping means for detachably connecting said third clamp to a positive terminal of a second battery, said third clamp having cable connecting means for detachably connecting said third clamp to a third electrically conductive wire;

a fourth clamp being electrically conductive and having clamping means for detachably connecting said fourth clamp to a negative terminal of the second battery, said fourth clamp having cable connecting means for detachably connecting said fourth clamp to a fourth electrically conductive wire;

an insertion plug electrically connected to said first electrically conductive wire and said second electrically conductive wire;

a receiving plug electrically connected to said third electrically conductive wire and said fourth electrically conductive wire; and an extension cord for electrically connecting said insertion plug to said receiving plug, wherein said extension cord having a length sufficient to electrically connect the first battery to the second battery.

17. Extendable jumper cables that maintain cable resistance when increasing cable length comprising:

a first clamp being electrically conductive and having clamping means for detachably connecting said first clamp to a positive terminal of a first battery, said first clamp having cable connecting means for detachably connecting said first clamp to two first electrically conductive cables;

a second clamp being electrically conductive and having clamping means for detachably connecting said second clamp to a negative terminal of the first battery, said second clamp having cable connecting means for detachably connecting said second clamp to two second electrically conductive cables;

a third clamp being electrically conductive and having clamping means for detachably connecting said third clamp to a positive terminal of a second battery, said third clamp having cable connecting means for detachably connecting said third clamp to two third electrically conductive cables;

a fourth clamp being electrically conductive and having clamping means for detachably connecting said fourth clamp to a negative terminal of the second battery, said fourth clamp having cable connecting means for detachably connecting said fourth clamp to two fourth electrically conductive cables, said first, second, third and fourth electrically conductive cables having a substantially same length as an initial length of said extendable jumper cables before being extended;

means for electrically joining said first clamp to said third clamp;

means for electrically joining said second clamp to said fourth clamp;

means for maintaining positive polarity of said first clamp and positive polarity of said third clamp; and means for maintaining negative polarity of said second clamp and negative polarity of said fourth clamp.

18. The extendable jumper cables of claim 17 wherein said two first electrically conductive cables include two substantially equal length portions detachably joined together.

19. The extendable jumper cables of claim 17 wherein said two second electrically conductive cables include two substantially equal length portions detachably joined together.

20. The extendable jumper cables of claim 17 wherein said two first electrically conductive cables and said two second electrically conductive cables are joined in an electrically series arrangement, said two second electrically conductive cables and said two fourth electrically conductive cables are joined in an electrically series arrangement, and said two series joined first and third cables are disposed in an electrically parallel arrangement with said two series joined second and fourth cables, thereby allowing the initial length of said extendable jumper cables that includes one of said two first electrically conductive cables, one of said two second electrically conductive cables, one of said two third electrically conductive cables and one of said two fourth electrically conductive cables to be doubled without reducing an electrical current flow between the first battery and the second battery.

* * * * *